Nov. 30, 1971  R. P. SCHNEIDER  3,623,319
CONTROLLABLE INJECTOR FOR ROCKETS
Filed Feb. 20, 1967
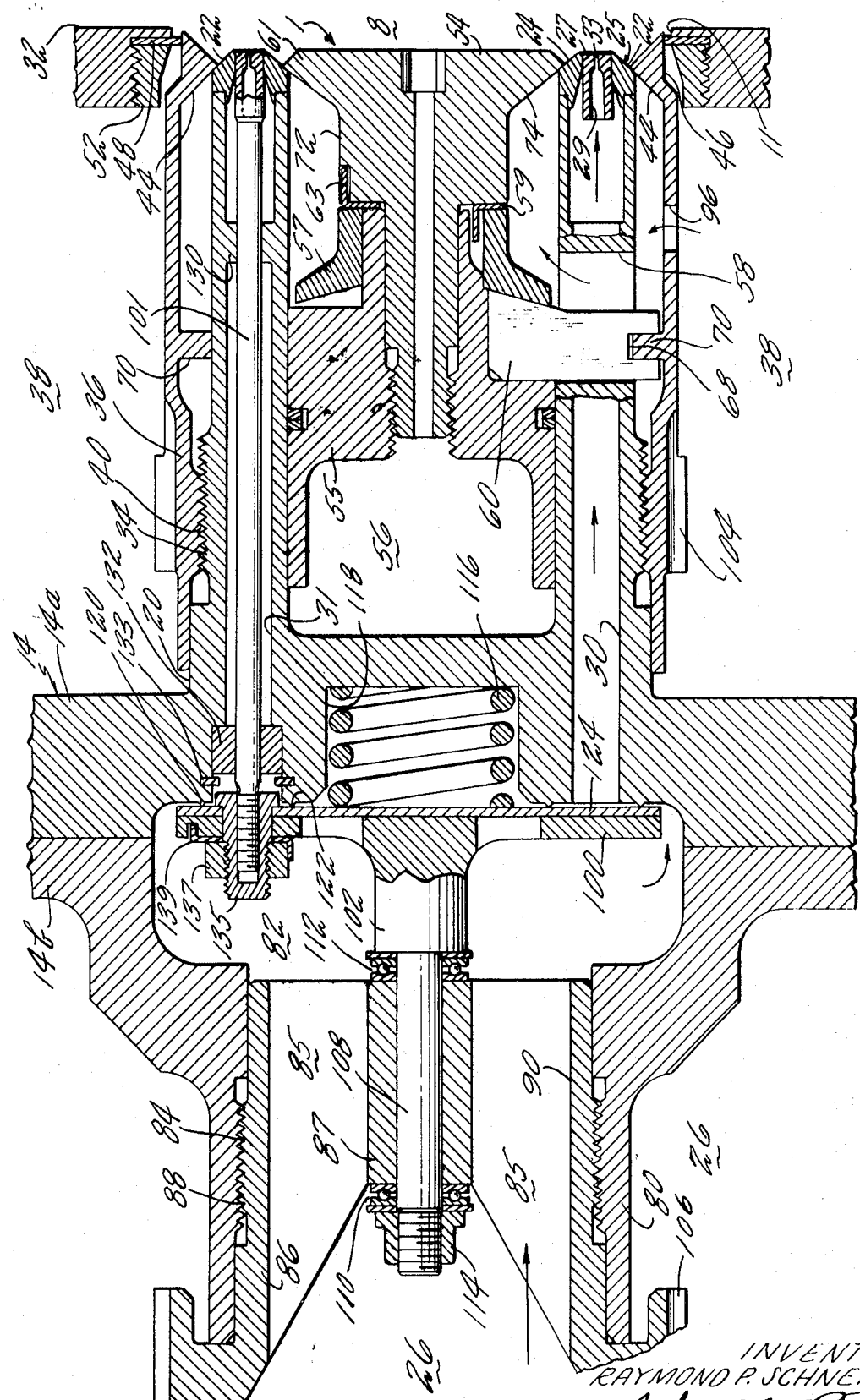
INVENTOR
RAYMOND P. SCHNEIDER
BY Jack N. McCarthy
AGENT

United States Patent Office 3,623,319
Patented Nov. 30, 1971

3,623,319
CONTROLLABLE INJECTOR FOR ROCKETS
Raymond P. Schneider, North Palm Beach, Fla., assignor to United Aircraft Corporation, East Hartford, Conn.
Filed Feb. 20, 1967, Ser. No. 619,114
Int. Cl. F02g 1/00
U.S. Cl. 60—39.74                6 Claims

ABSTRACT OF THE DISCLOSURE

An injector for two propellants wherein the propellants are provided with variable injection means located at the face of the injector.

---

The invention herein described was made under a contract with the Department of the Air Force.

CROSS REFERENCES TO RELATED APPLICATIONS

This application is related to application Ser. No. 390,521, filed Aug. 19, 1964, for Controllable Injector for Rockets which has matured into Pat. No. 3,488,951 granted Jan. 13, 1970.

BACKGROUND OF THE INVENTION

This invention relates to injector heads wherein the flow of propellants is variably controlled within the injector head adjacent the face thereof.

While prior art on injectors is abundant, one patent which appears to be closely related to this invention is U.S. Pat. No. 3,064,903 for a Variable Area Fuel Injector by Mr. Butler.

SUMMARY OF THE INVENTION

It is a primary object of this invention to provide an injector head with variable flow controlling means being mounted adjacent the face of an injector head for a plurality of propellants.

The present invention includes elongated rods so that the actual valve surfaces can be operated from a remote point. A small fixed opening is provided so that a primary flow is provided for the small starting flow requirements. A seal plate is arranged to provide a shutoff feature which will prevent a flow of propellant from the rear chamber of the injector to the face of the injector.

BRIEF DESCRIPTION OF THE DRAWING

The figure is a sectional view of one of the injector units.

DESCRIPTION OF THE PREFERRED EMBODIMENT

The injector unit set forth in the figure can be one of a plurality located in the injector head of a rocket engine or it can be the only one, depending on the size of the injector head desired. The environment for this injector head is shown in detail in U.S. application Ser. No. 390,521. The injector is formed having: (1) a plate 32 whose face forms one end of the combustion chamber; (2) a main divider 14 formed of two plates 14a and 14b fixed together—this provides a chamber 38 with the plate 32 for one propellant; (3) a chamber 26 for another propellant formed rearwardly of the main divider 14; (4) one or more injector units 1 through which the propellants are injected into the combustion chamber 8; and (5) means for regulating the flow of propellants through each injector unit.

As can be seen from the figure, an injector unit 1 cooperates with main divider 14 and plate 32 and part thereof is formed integral with the divider 14. A large hole 11 is cut in the face plate 32 to accept each injector element. An annular projection 20 extends from the plate 14a of main divider 14 and is aligned with and extends into a cooperating opening 11. The free end of the annular projection 20 has an annular nozzle 25 attached thereto having tapering sides 22 and 24 facing the combustion chamber 8. A plurality of passageways 30 extend for the length of the annular projection 20 to transfer a fuel or propellant from the chamber 26 to the annular nozzle 25. The annular nozzle 25 is made of two separate rings fixed to the end of the annular projection 20. The annular opening formed between the two separate rings is sized so that a movable valve member 27 slidably engages the rings when the valve member is in its closd position. Said annular movable valve member 27 contains an annular groove 29 which extends inwardly from the rear thereof and a smaller annular passageway 33 extending between the annular groove 29 and the face of the valve member facing the combustion chamber 8. If desired, the annular passageway 33 could be made up of a plurality of small holes. The actuating means for the valve member 27 will be hereinafter described. The nozzle 25 is made of a highly conductive and heat resistant material, such as copper or nickel, to avoid burning of the nozzle. Annular projection 20 is externally threaded at 34 to receive a metering sleeve 36 having internal threads at 40. It can be seen that rotation of the sleeve 36 will provide for axial movement of the sleeve along the projection 20.

The end of the sleeve 36 adjacent the annular nozzle 25 is tapered inwardly at 44 to approximately the same angle as the tapered face 22 of the nozzle. The inward taper at 44 extends inwardly to a point forming an opening which is smaller in diameter than the outer diameter of the annular projection 20 at its free end. At this point, the sleeve is provided with a short cylindrical surface 46. This cylindrical surface 46 is guided on a ring 48 which is held in place in face plate 32 by a nut 52 having a contoured inner face which does not interfere with movable sleeve 36.

A core 54 is located in the space 56 formed within the annular projection 20. This core is connected to the sleeve 36 to move therewith in the following manner. The projection 20 has a plurality of slots 58 located between the passages 30 and extending through the projection. These slots receive synchronizing bars 60 which extend between the core 54 and the sleeve 36. These bars extend radially from the core and are fixed thereto.

The core 54 is made up of a piston-like member 55 which slidably engages the sides of the space 56 and is axially movable therein. This member 55 has slots which receive the inner ends of the bars 60. A spacer 57 fits over a necked-down portion of the outward side of the member 55 and mates with the inner ends of the bars 60. A lock washer 59 is placed over the end of the member 57 with an axially extending portion thereof fitting in a cutout opening in the member 55. The valve section 61 is threadably mounted by a stem which projects into an opening in 55 and a shoulder thereon presses the number 57 against the bars 60 to fix them in place. The lock washer 59 is then bent at 63 to maintain the core in an assembled position. While the bars are fixed with respect to the core 54, they are only fixed axially with respect to the sleeve 36 and relative rotation is permitted therebetween. This is provided by a recess 68 in the top of each of the bars which receive an annular projection 70 which extends inwardly from the sleeve 36 adjacent the threaded area 40. The inner end of this projection 70 slidably engages the outer surface of the projection 20. It can be seen now that as the sleeve 36 is rotated, by movement of the gear teeth 104 located around the outer surface of the sleeve 36, the projection 70 will move in and out along with the sleeve and that this in and out movement of the projection 70 will carry the bars 60 along with it in their cooperating slots 58 and thereby move the core 54 axially in unison with the sleeve 36.

The valve section 61 of the core 54 is formed so that it has a necked-down portion 72 which is spaced inwardly from the annular projection 70 and flares outwardly at 74 at an angle so as to be approximately parallel to the tapered side 24 of the nozzle 25. This surface terminates at approximately the same point as the tapered surface 44 of the sleeve 36. The outward taper at 74 extends outwardly to a disc area which is larger than the inner diameter of annular projection 20. It can now be seen that as the sleeve 36 and core 54 move in unison, the annular spaces between the annular tapered surface at 44 and the annular tapered side 22 and the annular flared surface at 74 and the annular tapered side 24 will increase or decrease depending on direction of movement.

An annular projection 80 is integral with plate 14b and extends away from the plate into the chamber 26. Said annular projection 80 being coaxially aligned with a cooperating annular projection 20. At the bottom of the annular projection 80, a recess 82 is formed in the plates 14b and 14a to provide for part of an actuating mechanism to be hereinafter described. The bottom of the recess 82 is connected around its periphery to the passageways 30 which extend into the annular projection 20. A plurality of other longitudinal openings 31 also extend from the bottom of the recess 82 to the free end of the annular projection 20 adjacent the nozzle 25. These openings are for part of the actuating mechanism to be hereinafter described.

The annular projection 80 is internally threaded at 84 to receive a sleeve 86 having external threads at 88. This sleeve has a passageway 90 therethrough which connects chamber 26 to the ends of passageways 30 in the plate 14a. The sleeve 86 has a cylindrical sleeve 87 positioned coaxially therewith by a plurality of webs 85. This cylindrical sleeve is connected to a part of the actuating mechanism to be hereinafter described. It can be seen now that as sleeve 86 is rotated by movement of the gear teeth 106 located around the outer end of the sleeve 86, the cylindrical sleeve 87 will move in and out along with the sleeve. This in and out movement of the sleeve moves the actuating mechanism, hereinafter described, in a like manner.

The actuating mechanism which extends between the sleeve 87 and the valve member 27 comprises basically an actuating plate 100 connected to the sleeve 87 which engages the bottom of the recess 82 so that it covers all of the passageways 30 and openings 31 and rods 101 which connect the plate 100 to the valve member 27. This plate is fixed to move axially with the movement of sleeve 86 and is provided for relative rotation therebetween. This is done by having a projection 102 thereon necked down at 108 so that it will fit in the inside of sleeve 87. Thrust bearings 110 and 112 are provided at each end for ease of movement and the assembly is held together by a nut 114. Spacers are provided where necessary to properly position members for production tolerances. To take up any loose axial movement between the plate 100 and the sleeve 86, a spring 116 is provided in a recess 118 of plate 14a to continually bias the plate 100 towards the sleeve 86.

Since the passageways 30 and openings 31 enter the bottom of the recess 82 in an annular alignment, an annular outer land 120 is provided extending from the bottom around the outside of the locations where the passageways and openings intersect the bottom, and an annular inner land 122 is provided around the inside. The lands 120 and 122 are formed having a relatively sharp edge. A plate or layer of sealing material 124 is placed on the plate 100 to coact with the lands 120 and 122 to provide a positive shutoff of flow of propellant from the chamber 26 to the groove 29 of the valve 27.

The movement of the plate 100 is transmitted to the valve member 27 by the rods 101. Each rod 101 is attached to the plate and valve member in a like manner so only the attachment of one rod 101 will be described. Each rod 101 is guided in its opening 31 by a fixed guide member 130 and a guide insert 132 which fits around the rod in a countersunk portion in plate 14a located coaxially with the opening 31. A snap ring 133 holds this insert in place. One end of each rod 101 is threaded externally and has a cap member 135 thereon which projects through an opening in the plate 124 and plate 100. The portion extending past the plate 100 is externally threaded to receive a nut 137. This nut is held in place by a lock washer 139. This arrangement is used to provide for adjustment of the length of rod 101. The other end of rod 101 is fixed to the rear of the valve member 27 in such a manner so as to space the two annular parts forming the valve member 27. While the two annular members forming the valve member 27 are fixed together and spaced in this manner, other known means may be used.

One propellant enters the chamber 38 from a supply and passes through openings 96 around the sleeve 36 into the annular space formed between annular member 20 and the sleeve 36. This propellant then passes from this annular chamber through openings 58 to the annular chamber formed between the annular member 20 and the core 54. It can be seen that the propellant in these two chambers will flow past the nozzle 25 by the surfaces 74 and 24, and 44 and 22, respectively, when movement of the gear 104 moves the sleeve 36 and core 54 forwardly from its position as shown in FIG. 1.

Another propellant enters through the sleeve 86 into the recess 82 for direction through pasageways 30 to the annular space connecting the ends of the openings 30. The propellant then enters the groove 29 and passageway 33 for ejection into the combustion chamber at a point between the rings of injection of the other propellant. To increase the injection of this propellant, the gear 106 is moved until the rods 101 lift the valve member 27 from its seat within annular nozzle 25 to increase the flow at this point. While the gears 104 and 106 can have any type of actuating device desired, one means of actuation is shown in application Ser. No. 390,521, referred to above.

It is to be understood that the invention is not limited to the specific description above or to the specific figure shown, but may be used in other ways without departure from its spirit as defined by the following claims.

I claim:

1. A controllable propellant rocket injector including a face plate means, a second plate means forming a first propellant chamber with said face plate means, a third plate means forming a second propellant chamber with said second plate means, said face plate means having an opening therein, said second plate means having an annular projection extending therefrom into said opening, throttling means movable with relation to said annular projection, portions of said annular projection and said throttling means forming two annular passageways, an annular opening in the end of said annular projection, first passage means for connecting the first propellant chamber to said two annular passageways, second passage means connecting the second propellant chamber to said annular opening, and second throttling means movable with relation to said annular opening, said last-named throttling means including:
   (a) a movable annular valve member which cooperates with said annular opening,
   (b) means connected to said annular member for moving it axially,
   (c) said means extending from said annular member through said annular projection to actuating means positioned in said second propellant chamber.

2. A controllable propellant rocket injector as set forth in claim 1 wherein said means connected to said annular valve member comprises a plurality of rods.

3. A controllable propellant rocket injector as set forth in claim 1 wherein said movable annular valve member has a fixed opening therein.

4. A controllable propellant rocket injector as set forth in claim 1 wherein said actuating means includes a positive propellant shutoff to the annular valve member.

5. A controllable propellant rocket injector as set forth in claim 2 wherein said actuating means comprises a valve plate which is connected to said rods for variably positioning the movable annular valve member with the annular opening.

6. A controllable propellant rocket injector as set forth in claim 5 wherein a sealing land extends around said second passage means where it enters the second propellant chamber, said valve plate being positioned so as to engage said land when the actuating means has placed the annular valve member in its closed position.

References Cited

UNITED STATES PATENTS

| | | | |
|---|---|---|---|
| 2,730,433 | 1/1956 | Cartledge | 239—424 |
| 2,810,259 | 10/1957 | Burdett Jr. | 60—258 |
| 2,870,603 | 1/1959 | Long | 60—257 |
| 3,170,286 | 2/1965 | Stein | 60—258 |
| 3,232,049 | 1/1966 | Rhodes | 239—416 |

SAMUEL FEINBERG, Primary Examiner